United States Patent Office 2,825,715
Patented Mar. 4, 1958

2,825,715

POLYMERS OF N-(AMINO-1,2,4-TRIAZOLYL) AMIDES OF ALKENYL-1,2-DIOIC ACIDS

Gaetano F. D'Alelio, Pittsburgh, Pa., assignor to Koppers Company, Inc., a corporation of Delaware No Drawing. Application June 26, 1953
Serial No. 364,509

18 Claims. (Cl. 260—78)

This invention relates to new monomers and to new polymeric materials derived therefrom and is particularly directed to the polymerization products obtained by polymerizing a mass comprising as a new monomer an amide of a diamino-1,2,4-triazole and an ethylene alpha, beta-dicarboxylic acid hereinafter referred to as a polymerizable ethenedioic acid and a copolymerizable compound especially acrylonitrile. The invention also relates to compositions of these polymerization products adapted to the formation of shaped articles, in many cases to molecularly oriented shaped articles, particularly to fibers, threads, bristles, mono-filaments, etc., hereinafter referred to as fibers, and other shaped articles such as films and the like, which articles show improved dyeing properties.

It has been known for some time that certain copolymers of acrylonitrile may be adapted to the preparation of shaped articles, such as, films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoliation of material by gelation during storage, embrittlement of fibers, fouling of spinning jets, and other production difficulties.

In accordance with the present invention it has now been found that crosslinking is avoided and that improvements in dyeing properties of acrylonitrile polymers are obtained by the polymerization of monomeric masses comprising acrylonitrile and an amide of a diamino-1,2,4-triazole and a polymerizable ethenedioic acid with or without other copolymerizable ethylenic compounds. It has been found further that in addition to the fact that the amines of diamino-1,2,4-triazoles and polymerizable ethenedioic acids yield particularly valuable copolymers with acrylonitrile, they can also be used effectively to form copolymers with other types of copolymerizable ethylenic compounds having a $CH_2=C<$ group. Thus it has been found that valuable polymerization products are prepared in accordance with the invention by polymerizing a monomeric mass comprising an amide of a diamino-1,2,4-triazole and a polymerizable ethenedioic acid, and a polymerizable compound, such as, acrylonitrile and the other polymerizable ethylenic compounds listed hereinafter.

The amides of diamino-1,2,4-triazoles and polymerizable ethenedioic acids are prepared by acylating guanazole (3,5-diamino-1,2,4-triazole) or a guanazole derivative with an acylating agent, such as, the polymerizable ethenedioic acid per se and various derivatives such as the anhydride, the acid chloride, the mono-esters, and the mono-amides. The readily polymerizable ethenedioic acids include maleic, fumaric, citraconic and mesaconic acids. These acids may be represented by the formula $$HOOC-CH=CR'=COOH$$

in which R' is either hydrogen or the methyl radical. The formulas herein are not intended to distinguish between cis and trans forms. Since the ethenedioic acids are dibasic acids and guanazole is a difunctional base various types of amides can be obtained. Thus by reacting one mole of the ethenedioic acid with one mole of guanazole, there is obtained the monoamide acid of guanazole and an ethenedioic acid. This amide-acid has the formula

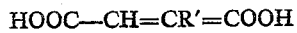

$$H_2N-AH-NH-CO-B-COOH$$

in which A is the 1,2,4-triazole nucleus of guanazole and B is the $-CR'=CH-$ group of the ethenedioic acid. Since the ethenedioic acids which are readily polymerizable (with a copolymerizable compound) are maleic, fumaric, citraconic, and mesaconic acids, R' in this group is either hydrogen or the methyl radical. The amide-acid can then be esterified to give an ester which has the formula

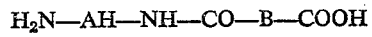

$$H_2N-AH-NH-CO-B-COOR$$

or further amidated with ammonia or another amine to give an amide which has the formula $$H_2N-AH-NH-CO-B-CONR_2$$

These types of compounds can also be formed by using the appropriate mono-ester or mono-amide of the ethenedioic acid to acylate the guanazole. By reacting two moles of guanazole with one mole of ethenedioic acid there is obtained the di-(mono-amide) of guanazole and an ethenedioic acid

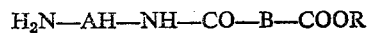

$$H_2N-AH-NH-CO-B-CO-NH-AH-NH_2$$

Also by reacting one mole of guanazole with two moles of the ethenedioic acid there is obtained the diamide-diacid of guanazole and an acid which has the formula

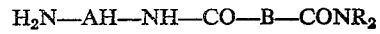

$$HOOC-B-CO-NH-AH-NH-CO-B-COOH$$

This dibasic acid can then be esterified or further amidated to give the mono- or di-esters or the mono- or di-amides thereof. These di-ethenedioic derivatives advantageously are avoided except where crosslinking is not objectionable.

For reasons of economy and ease of preparation, the methyl or ethyl esters of the mono-amide-acid of guanazole and the ethenedioic acid are usually preferred when an ester is used. These can be prepared by reacting molar proportions of the ethenedioic acid chloride or anhydride with guanazole to form the mono-amide-acid of guanazole and ethenedioic acid. The acid chloride and anhydride are sufficiently reactive to form the amide merely upon mixing at room temperature. In some cases where the anhydride or acid chloride are not as reactive or in order to get more complete action gentle heating may be advantageous. This amide-acid can be readily converted to the sodium or potassium salt and esterified at room temperature with dimethyl sulfate or diethyl sulfate to form the methyl or ethyl ester. Alternatively, the ethenedioic acid is methylated or ethylated to the mono stage by refluxing it with methanol or ethanol in the presence of a small amount of an esterification catalyst, such as sulfuric acid, toluene sulfonic acid, cation-exchange resins containing sulfonic acid groups, etc. The mono-ester thus formed is then converted to the acid chloride by refluxing with thionyl chloride, and the acid chloride is reacted with guanazole to form the desired methyl or ethyl ester of the mono-amide acid of guanazole and the ethenedioic acid.

Guanazole is readily prepared by refluxing an aqueous solution of dicyandiamide and a hydrazine salt, such as, the hydrochloride and then neutralizing the acid. Substituted guanazoles can be prepared in which one or more of the hydrogens are replaced by alkyl, aryl, aralkyl, alkaryl, and cycloaliphatic groups or in which one of the hydrogens is replaced by an acyl group, as listed below, by using a substituted hydrazine instead of hydrazine and/or a substituted biguanide instead of dicyandiamide, and/or by mono-acylating the guanazole with an acid before the acylation with the ethenedioic acid.

The ethenedioic acid amides of diamino-1,2,4-triazole of this invention are represented by the general formula

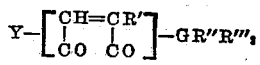

in which Y is either the radical —GR"R"'₃ or the radical RO— or R₂N— in which R is hydrogen or an alkyl, aryl, aralkyl, alkaryl, or cycloaliphatic group which can have halogen-, acyloxy-, or alkoxy- substituents or when Y is R₂N—, the R's can be linked together to form with the nitrogen a heterocyclic group; G is a diamino-1,2,4-triazole group (the guanazole nucleus); R' is hydrogen, or the methyl radical; R" is hydrogen or the radical R"', or an acyl group; and R"' is hydrogen or an alkyl, aryl, aralkyl, and alkaryl, or cycloaliphatic group. The diamino-1,2,4-triazole group is the guanazole nucleus obtained by removing the five hydrogens from guanazole and has the structure

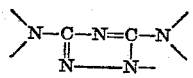

Thus in the amides of the invention one or more of the hydrogens of guanazole can be replaced by such groups as methyl, ethyl, isopropyl, n-butyl, sec-butyl, amyl, hexyl, decyl, phenyl, tolyl, xylyl, benzyl, phenethyl, naphthyl, cyclohexyl, cyclopentyl, and the like and one of the hydrogens can be replaced by an acyl group such as acetyl, formyl, propionyl, butyryl, benzoyl, etc. Advantageously, the hydrocarbon substituents should contain not more than a total of four carbon atoms and advantageously should not contain more than two carbon atoms each. The acyl substituents advantageously are the acyl groups of saturated monocarboxylic acids (alkanoyl) preferably the formyl and acetyl groups.

When the amides used in the practice of the invention contain an ester group or an amide group other than group —GR"R"'₃ the radical R may be methyl, ethyl, propyl, isopropyl, n-butyl, sec-butyl, amyl, hexyl, decyl, chloromethyl, chloroethyl, cyclohexyl, methyl-cyclopentyl, propyl-cyclopentyl, amyl-cyclopentyl, methyl-cyclohexyl, dimethyl - cyclohexyl, chlorocyclohexyl, phenyl, chlorophenyl, xenyl, naphthyl, tolyl, chlorotolyl, xylyl, ethyl-phenyl, propyl-phenyl, isopropyl-phenyl, benzyl, chlorobenzyl, phenethyl, phenyl-propyl, phenyl-butyl, acetoxy - ethyl, chlorophenoxy - ethyl, acetoxy-propyl, acetoxy - isopropyl, acetoxy - phenyl, acetoxy-benzyl, acetoxy - tolyl, acetoxy - cyclohexyl, methoxy-propyl, ethoxy-propyl, methoxy-phenyl, methoxy-benzyl, methoxy-tolyl methoxy-cyclohexyl, etc. or part of a heterocyclic amino group, such as, the piperidyl, piperazino and morpholino groups.

As an illustration, the ethenedioic ester amides and acid amides of diamino-1,2,4-triazole of this invention and their polymer units are represented by the following formulas respectively:

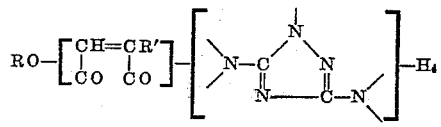

and

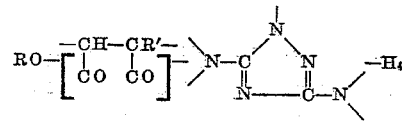

wherein, for the acid R is hydrogen and for the ester amide R is methyl or ethyl and R' is hydrogen or a methyl group.

The proportions of the amide in the polymerization products of the invention can vary over a wide range, ranging from equimolar proportions of amide down to very small amounts of amide such as can be employed in acrylonitrile polymers to impart dye susceptibility thereto. Although even smaller amounts are somewhat effective, the improvement in susceptibility of acrylonitrile copolymers to dyes becomes particularly noticeable when the amide content of the copolymer is about 0.1 percent and the susceptibility increases as the amount of amide is increased. Ordinarily sufficient improvement in dye susceptibility is obtained with amounts of amide ranging up to about 10 or 15 percent but it may be advantageous for reasons such as in the preparation of ion-exchange polymers or additives to improve dyeing properties to have a larger proportion of amide in the acrylonitrile copolymer. In such cases the concentration of amide can range up to or approaching 50 mole percent. Within these proportions acrylonitrile copolymers of the invention show great affinity toward many dyes especially basic, acidic, vat and cellulose acetate dyes.

In addition to the improvements effected in the resulting copolymers, the use of amides of diamino-1,2,4-triazole and polymerizable ethenedioic acids has certain other advantages over the use of the corresponding acids. For example, the amides are more soluble in acrylonitrile than the acids. Therefore it is generally easier to get complete copolymerization of the amide with acrylonitrile in solution, emulsion and suspension polymerizations. Still further advantages accrue from the presence of these amides. Thus when non-esterified mono-amides are used the copolymers of the invention show high susceptibility to basic dyes.

The acrylonitrile copolymers discussed herein are soluble in N,N-dimethyl acetamide (DMA), N,N-dimethyl formamide (DMF), butyrolactone, ethylene carbonate, N,N-dimethyl methyl urethane of the formula

ethylene carbamate, N-methyl-2-pyrrolidone, and a number of similar solvents, used alone or in conjunction with N,N-dimethyl cyanamide, N,N-dimethyl cyano-acetamide, N,N-dimethyl methoxy-acetamide, methylene dinitrile, methylene dithiocyanate, formyl caprolactam, formyl morpholine, tetramethylene sulfone, etc. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described in the following examples which illustrate methods of practicing the invention. In these examples and throughout the specification, "parts" and "percentages" are intended to mean parts by weight and percentages by weight.

Example I 20.2 grams (0.2 mol) guanazole is admixed with approximately 150 ml. diethyl ether and there is added slowly and with stirring 19.6 grams (0.2 mol) maleic anhydride. The mixture is refluxed for approximately ½ hour, cooled and the ether evaporated. The residue is recrystallized from absolute ethanol. There is obtained the mono-acid amide of guanazole and maleic acid.

Ultimate analyses for carbon, hydrogen and nitrogen and molecular weight determinations on the product give results which are in close agreement with the theoretical values for the mono-acid amide of guanazole and maleic acid.

Substitution of equivalent quantities of polymerizable ethenedioic acid anhydrides or diamino-1,2,4-triazoles, respectively, in the foregoing procedure for the maleic anhydride and guanazole there used yields the various mono-amides of ethenedioic acids and guanazoles of this invention which are characterized by ultimate analyses and molecular weight determinations as in the foregoing procedure.

Example II 39.8 grams (0.2 mol) of mono-acid amide of guanazole and maleic acid (prepared as in Example I) is dissolved in a minimum amount of water and 8.0 grams (0.2 mol) sodium hydroxide added slowly to form the sodium salt. The water is evaporated and the residue is admixed with approximately 150 ml. diethyl ether. There is added slowly and with stirring 25.0 grams (0.2 mol) dimethyl sulfate. The ether is evaporated and the residue recrystallized from absolute ethanol. There is obtained the methyl ester of the mono-amide of the ethenedioic acid.

Ultimate analyses for carbon, hydrogen and nitrogen and molecular weight determinations on the product give results which are in close agreement with the theoretical values for the methyl ester of the mono-amide of the ethenedioic acid.

Substitution of the various mono-amides of Example I or diethyl sulfate respectively in the foregoing procedure for the mono-acid amide of guanazole and maleic acid and dimethyl sulfate there used yields the various methyl and ethyl esters of the mono-amides of ethenedioic acids of this invention which are characterized by ultimate analyses and molecular weight determinations as in the foregoing procedure.

Example III 39.8 grams (0.2 mol) of mono-acid amide of guanazole and maleic acid is admixed with approximately 150 ml. diethyl ether and 29.7 grams (0.25 mol) thionyl chloride and the mixture refluxed for approximately ½ hour. The ether is evaporated and there is obtained the acid chloride.

This acid chloride is added slowly and with stirring to a mixture of 10.0 grams (0.2 mol) dimethyl amine and 150 ml. diethyl ether in a flask equipped with a reflux condenser. After the addition of the acid chloride the mixture is refluxed for approximately ½ hour and the ether is then evaporated. The residue is dissolved in water and shaken with 29.0 grams (0.125 mol) silver oxide to remove the chloride ion. The mixture is filtered and the filtrate evaporated to dryness. The residue is recrystallized from absolute ethanol. There is obtained N-dimethyl-N'-(amino-1,2,4-triazolyl)-ethenedioic acid diamide.

Ultimate analyses for carbon, hydrogen and nitrogen and molecular weight determinations on the product give results which are in close agreement with the theoretical values for N-dimethyl-N'-(amino-1,2,4-triazolyl)-ethenedioic acid diamide.

Substitution of equivalent quantities of the various mono-amides of Example I or dialkyl amines, respectively, in the foregoing procedure for the mono-acid amide of guanazole and maleic acid and the dimethyl amine there used yields the various unsymmetrical diamides of this invention which are characterized by ultimate analyses and molecular weight determinations as in the foregoing procedure.

Example IV 43.5 grams (0.2 mol) of the acid chloride of Example III is added slowly and with stirring to a mixture of 20.2 (0.2 mol) guanazole and 150 ml. diethyl ether in a flask equipped with a reflux condenser. After addition of the acid chloride, the mixture is refluxed for approximately ½ hour and the ether is then evaporated. The residue is dissolved in water and shaken with 29.0 grams (0.125 mol) silver oxide to remove the chloride ion. The mixture is filtered and the filtrate evaporated to dryness. The residue is recrystallized from absolute ethanol. There is obtained N,N'-(amino-1,2,4-triazolyl)-ethenedioic acid diamide.

Ultimate analyses for carbon, hydrogen, and nitrogen and molecular weight determinations give results which are in close agreement with the theoretical values for N,N'-(amino-1,2,4-triazolyl)-ethenedioic acid diamide.

Substitution of equivalent quantities of the various acid chlorides obtained as in Example III or various diamino-1,2,4-triazoles in the foregoing procedure for the particular acid chloride and guanazole there used yields the various diamides of ethenedioic acids of this invention which are characterized by ultimate analyses and molecular weight determinations as in the foregoing procedure.

Example V

Five polymers of acrylonitrile are prepared from the following monomer compositions

| Polymer | Acrylonitrile, parts | Mono-acid amide of guanazole and maleic acid, parts |
|---|---|---|
| A | 100 |  |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 750–1,000 parts of distilled water at 30–50° C. containing dissolved therein one part of ammonium persulfate, 0.6 to 1.5 parts of sodium bisulfite and 0.5 part of sodium dodecylbenzene sulfonate. The reaction is continued for 2–6 hours, at which time a yield of about 90 percent solid polymer is precipitated. The resulting polymers have molecular weights over 10,000. Each polymer is dissolved in N,N-dimethyl acetamide or butyrolactone and a film cast from each solution.

A water solution of methylene blue dye (a basic dye) is prepared by making a paste of the dye and then diluting to a one percent by weight dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film shows only a light tint, whereas the amide copolymers are dyed a deep and dense shade. Identical films, cold-drawn and heat-treated, show dyeing characteristics similar to the undrawn films.

Fibers are spun from the same N,N-dimethyl acetamide or butyrolactone solutions either by dry spinning or by wet spinning, into glycerine baths. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films a light tint being acquired by the unmodified polyacrylonitrile fibers and a deep and dense color being given to the copolymer fibers.

*Example VI*

Five polymers of acrylonitrile are prepared from the following monomer compositions

| Polymer | Acrylonitrile, parts | Methyl ester of the mono-acid amide of guanazole and maleic acid, parts |
|---|---|---|
| A | 100 | |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 0.5 to 1 part sodium dodecylbenzene sulfonate, 1.0 part of ammonium persulfate, 0.5 part of sodium bisulfite, and 100 parts of monomer or monomer mixture. The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer is dissolved in dimethyl formamide or butyrolactone and a film cast from the solution. The film is washed entirely free of solvent and stretched at a ratio of about 8:1 in a glycerine bath at 135 to 145° C. The film is then washed in water and dyed in a bath containing for each part of film 0.05 part of 1,5-diamino-4,8-dihydroxyanthraquinone - 3 - sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile when treated in this manner has little or no color, all of the polymers are dyed to a deep blue shade.

Fibers are spun from the same solutions either by dry spinning, or by wet spinning. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, tetramethyl urea, butyrolactone, formyl morpholine, etc.

Instead of the methyl ester of the amide-acid of the above example, various other esters can be used, such as the ethyl, propyl, isopropyl, butyl, isobutyl, teriary-butyl, hexyl, tolyl, phenyl, naphthyl, cyclopentyl, cyclohexyl, benzyl, phenethyl, etc. esters. Likewise the esters of the other amide-acids disclosed above can be used.

*Example VII*

Five parts of the copolymer fiber D of Example V is dyed to a deep green shade using the vat color dimethoxy-dibenzanthrone at 70° C. in a bath containing for each part of fiber 0.5 part of dye, 0.25 part sodium hydroxide, 0.5 part sodium hydrosulfite and 100 parts of water (20:1 bath-fiber ratio). After the first 15 minutes of heating, 0.25 part of Glauber's salt is added. The sample is then oxidized in a 0.5 percent sodium dichromate 1.0 percent acetic acid at 70° C. for 30 minutes in a 20:1 bath-fiber ratio. The dyed fiber is then scoured in a 0.5 percent boiling soap solution. A sample of yarn prepared from the unmodified polyacrylonitrile and dyed under the same conditions acquired a light shade of color.

When 1,5-di-p-anisoylamino - 4,8 - dihydroxyanthraquinone is used as the vat dye, the fiber is dyed a strong violet color.

The procedures of this example and of Example V can be followed with the various other amide-acids disclosed above instead of the mono-acid amide of guanazole and maleic acid.

*Example VIII*

The procedure of Example V is repeated for the polymerization of the following monomer compositions

| Polymer | Acrylonitrile, parts | Vinyl Chloride, parts | Methyl ester of the mono-acid amide of guanazole and maleic acid, parts | Copolymer Soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | $NO_2Me$. |
| E | 57 | 40 | 3 | $NO_2Me$. |
| F | 37 | 60 | 3 | Acetone. |

Sometimes copolymers D and E, when dissolved in nitromethane may have gelled, partially dissolved particles known as fisheyes. In such cases, the solubility can be improved by the addition of small amounts of materials which are good solvents for acrylonitrile polymers, such as butyrolactone, dimethyl formamide, dimethyl acetamide, tetramethyl urea, etc. In addition, certain materials which are relatively poor solvents for polyacrylonitrile, such as diethyl formamide, diethyl acetamide, diethyl propionamide, etc., can be added to improve the solubility. Also, when acetone solutions of copolymer F contain gelled particles, clarification of the solution can be effected by the addition of nitromethane, diethyl formamide, diethyl acetamide, etc.

Dyeing tests of these copolymers show improvements in dyeing susceptibility similar to those of Example V.

*Example IX*

The procedure of Example V is repeated for the polymerization of the following monomer compositions

| Polymer | Acrylonitrile, parts | Styrene, parts | Methyl ester of the mono-acid amide of guanazole and maleic acid, parts |
|---|---|---|---|
| A | 88 | 7 | 5 |
| B | 78 | 17 | 5 |
| C | 68 | 27 | 5 |
| D | 58 | 37 | 5 |

Dyeing tests of these copolymers show improvements in dye susceptibility similar to Example V. In place of styrene, various styrene derivatives can be used, such as alpha-methyl-styrene; nuclear-substituted chloro-styrenes, i. e., ortho-, meta-, and para-chloro-styrenes, dichloro-styrenes, for example, the 2,3-, 2,4-, 2,5-, 2,6-, 3,4-, and 3,5-dichloro-styrenes; trichloro-styrenes; cyano-styrenes, such as ortho-, meta-, and para-cyano-styrenes, dicyano-styrenes, nuclear substituted alkyl-styrenes, such as mono- and di-methyl-styrenes, mono- and di-ethyl-styrenes, mono- and di-isopropyl-styrenes, aryl-substituted styrenes, i. e., para-phenyl-styrene, etc.; cyloaliphatic-substituted styrenes, such as para-cyclohexyl-styrene; fluoro styrenes, such as ortho-, meta-, para-fluoro-styrene, difluoro-styrenes, etc.; trifluoro-methyl-styrenes, such as ortho-, meta-, and para-trifluoromethyl-tyrenes, di-(trifluoromethyl)-styrenes, and various other styrenes or mixtures of any number of these with each other or with styrene.

*Example X*

The procedure of Example V is repeated for the polymerization of the following monomer compositions

| Polymer | Acrylonitrile, parts | Vinylidene Chloride, parts | Methyl ester [1] of the mono-acid amide of guanazole and citraconic acid, parts | Copolymer Soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

[1] Prepared as in Example II.

With the above vinylidene chloride copolymers and similar copolymers having a total of acrylonitrile and vinylidene chloride of at least 85 percent in the polymer molecules, only the more active solvents, such as butyrolactone, N,N-dimethyl acetamide, N,N-dimethyl formamide, N,N,N′,N′-tetramethyl urea, etc., can be used as solvents. The above copolymers dye more readily and thoroughly than similar copolymers containing no amide.

*Example XI*

The procedure of Example V is repeated for the polymerization of the following monomer compositions

| Polymer | Acrylonitrile, parts | Vinylidene Chloride, parts | Vinyl Chloride, parts | Ethyl ester of mono-acid amide of guanazole and maleic acid, parts |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example V.

*Example XII*

Instead of copolymerizing the maleic acid amides with the acrylonitrile, copolymers of the maleic amide, such as polymers D and E of Example VI, can be used as modifiers for the unmodified homopolymers and copolymers of acrylonitrile. For example, polymer E of Example VI, which consists of 80 parts of acrylonitrile and 20 parts of methyl ester of the mono-acid amide of guanazole and maleic acid, has excellent compatibility with homopolymers of acrylonitrile. In many cases, it is desirable to use the copolymers of the maleic acid amides, which have even a higher ratio of the maleic acid amide, as for example, as high as equal molar ratios of the maleic acid amide copolymerized with acrylonitrile or methacrylonitrile. Suitably from about 10 to 15 to about 70 percent of amide can be used. The overall amounts of amide required to improve the dyeability generally corresponds to the amounts indicated above for copolymers in which the main body of the acrylonitrile polymers contain the amide copolymerized directly therein, that is, from at least about 0.1 percent to advantageously 5 percent or even up to 15 percent amide in the ultimate polymer mixture. The copolymers of maleic acid amides with other monomers are satisfactory such as, for example, copolymers of styrene, methyl acrylate, ethyl methacrylate, alpha-methyl-styrene, etc., and these copolymers can be prepared substantially in accordance with the procedure of Example V. A solution of these copolymers is prepared in dimethyl formamide and added to a dimethyl formamide solution of polyacrylonitrile, so that a composition containing 90 parts combined acrylonitrile and other monomer units and about 10 parts of the amide units is obtained. The solution is heated to 130° C. after which the solution is filtered. Films and fibers prepared from this mixture are dyed in accordance with the process of Example VII and satisfactorily dyed, shaped articles are obtained. The unmodified polyacrylonitrile without the addition of these maleic acid amides showed little or no dye retention.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing at least one structural unit present in the acrylonitrile copolymer. Thus as there are present in the acrylonitrile copolymer, structural units derived from the acrylonitrile and styrene, it is desirable to have present in the modifying copolymer structural units derived from styrene and/or acrylonitrile, advantageously both, in addition to those derived from the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the present invention have in the polymer molecule a plurality of repeating units of the formula

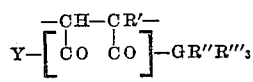

in which R′, R″, R‴, Y, and G are as indicated above and will contain additional repeating units of the formula

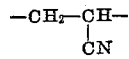

when the amide is copolymerized with acrylonitrile.

In addition, the polymerization products can contain any number of repeating units of the type obtained by the copolymerization of amides of the invention or a mixture of acrylonitrile and the amide with one or more copolymerizable ethylenic compounds, such as, for example, vinylidene chloride, vinyl chloride, styrene, alpha-methyl-styrene and methacrylonitrile. When the polymerization mass contains, in addition to the amide, a polymerizable monomer having a $CH_2=C<$ group in an amount such that the latter monomer is present to an extent of at least 50 mol percent of the overall monomer content, then monomers such as fumaronitrile, beta-cyano-acrylamide and methyl beta-cyano-acrylate can also be present in the polymerization mixture.

As previously indicated, the solvent resistance of such copolymers as contain one or more monomer units in addition to those formed by the acrylonitrile and the amides of the invention is affected by the type and proportion of copolymerizing monomer or monomers used to replace part of the acrylonitrile. For example, copolymers containing small amounts of the amide units can contain various proportions of such monomer units as obtained from vinylidene chloride, methacrylonitrile, fumaronitrile, and beta-cyano-acryl-amide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-amide type copolymer will decrease much more when one or more monomers having relatively weak secondary bonding forces, such as styrene or ethylene is used to replace part of the acrylonitrile than when a monomer having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which can also be present in the polymerizable masses for copolymerization with the amides used in the practice of this invention include one or more of the following: acrylates, e. g. methyl acrylate; methacrylates, e. g. methyl methacrylate; acrylamides; methacrylamides; vinyl esters, such as vinyl acetate; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes and the nuclear-substituted styrenes listed in Example IX, etc.

The polymerization products of this invention can be prepared by various polymerization systems, such as emulsion, suspension, mass and solution polymerizations. In addition to the monomers, the polymerizable mass may also contain other materials such as catalysts, e. g. peroxides, such as benzoyl peroxide, naphthyl peroxides, phthalyl peroxide, tertiary-butyl hydroperoxide, hydrogen peroxide, cyclohexyl hydroperoxide, tertiarybutyl perbenzoate, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis of a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., can be used as a precipitating bath for N,N-dimethyl acetamide, N,N,N',N'-tetramethyl urea, butyrolactone, ethylene carbonate, and other solvent compositions of these copolymers. The extruded fibers, from which substantially all of the solvent has been removed in the spinning step, about 1–10 percent remaining in the shaped article, can then be cold-drawn about 100–900 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent of amide in the copolymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and an amide according to the invention, the proportion of acrylonitrile in the copolymer can be much less than 85 percent without destroying the capacity for molecular orientation. Molecularly oriented, cold-drawn, shaped articles of particular usefulness are prepared from copolymer compositions containing in the polymer molecules 60–99.9 percent acrylonitrile, 0.1–15 percent, advantageously 0.1–5 percent, the amide, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of the monomers of this class being noticeable when the monomer is present in the polymer molecule in amounts of one percent or more.

The polymerization products of this invention show great affinity for the acetate, basic, acidic and vat dyes. The cellulose acetate dyes which are effective with these polymerization products are mainly amino-anthraquinone derivatives. The basic dyestuffs toward which these polymerization products show great affinity are preferably those which contain amide, alkylamide, or ammonium groups, such as $-NH_2$, $-N(CH_3)_2$, $-N(C_2H_3)_2$, $-NHC_6H_5$, $-N(CH_3)_2OH$, etc. and which may also be used in the form of their salts, i. e. the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavin T, Saffranine and Bismarck Brown. The cellulose acetate dyes which are effective with these polymerization products are mainly amino-anthraquinone derivatives, basic azo compounds and other basic substances, such as the Duranol, Dispersol, Sericol, etc. dyestuffs. A number of other acidic dyes that can be used are anthranilic acid→1-(4'-sulfophenyl), 3-methyl-5-pyrazolone; 1,5-diamino-4,8-dihydroxyanthraquinone-3-sulfonic acid; 1-amino-naphthalene-4-sulfonic acid→alptha-naphthol-4-sulfonic acid; the sodium salt of sulfanilic acid→aniline→2-benzoyl-amino-5-naphthol-7-sulfonic acid; the sodium salt of 4,4'-diaminostilbene-2, 2'-di-sulfonic acid ⇌ (phenol)₂ ethylated; 1,5-diamino-4,8-dihydroxyanthraquinone-3-sulfonic acid; dye prepared by diazotizing 1-aminonaphthalene-4-sulfonic acid and coupled with alpha-naphthol-4-sulfonic acid; the sodium salt of (m-amino-benzoic acid→o-anisidene) phosgenated; the sodium salt of (2-naphthol-6,8- disulfonic acid←benzidine→phenol) ethylated; dimethoxy-dibenzanthrone; and 1,5-di-p-anisolyamino-4,8-dihydroxyanthraquinone.

From the molecularly orientable copolymers of this invention fibers can be prepared having improved dyeing properties, low shrinkage in boiling water, sometimes as low as 3 to 5 percent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

This application is a continuation in part of application Serial No. 244,701, filed August 31, 1951, now abandoned.

What is claimed is:

1. As a new monomeric composition of matter, a compound having the formula

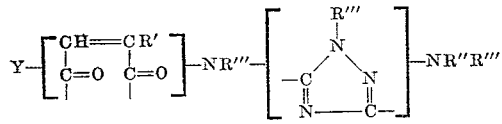

in which R' is selected from the class consisting of hydrogen and the methyl radical; R'' is selected from the class consisting of hydrogen, a carboxylic acyl group and a hydrocarbon radical; and R''' is chosen from the class consisting of hydrogen and a hydrocarbon radical, said carboxylic acyl group and said hydrocarbon groups containing a total of not more than four carbon atoms; and in which Y is selected from the class consisting of the carbonylophilic groups piperidyl, piperazino, morpholino,

RO—

R$_2$N— and

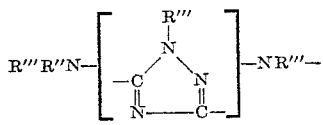

in which R'' and R''' are as defined above and contain a total of not more than four carbon atoms and R is selected from the class consisting of hydrogen and the alkyl, aryl, aralkyl, alkaryl, and cycloaliphatic hydrocarbon groups and their halo-, alkoxy-, and carboxylic acyl derivatives.

2. As a new monemeric composition of matter a compound having the formula

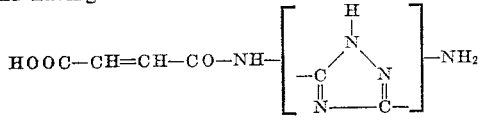

3. As a new monomeric composition, N-(amino-1,2,4-triazolyl) maleamic acid.

4. Methyl N-(amino-1,2,4-triazolyl) maleamate.

5. N-dimethyl-N'-(amino-1,2,4-triazolyl) ethenedioic acid diamide.

6. N,N'-(amino-1,2,4-triazolyl)-ethene-dioic acid diamide.

7. A polymeric composition comprising a copolymer of acrylonitrile and an amide of a diamino-1,2,4-triazole and a polymerizable monomer selected from the group consisting of maleic, fumaric, citraconic and mesaconic acids and anhydrides, acid chlorides, mono-esters, and mono-amides of said acids, said copolymer having a molecular weight of at least about 10,000 and containing in the polymer molecule no more than about 15 percent by weight of said amide.

8. A polymeric composition comprising a copolymer of about 60–98.9 percent by weight acrylonitrile, about 0.1 to 5 percent by weight N-(amino-1,2,4-triazolyl) maleamic acid, and about 1 to 39.9 percent by weight of a compound selected from the class consisting of vinyl chloride, vinylidene chloride, styrene, alpha-methylstyrene, methacrylonitrile, fumaronitrile, beta-cyano-acrylamide, and methyl beta-cyano-acrylate.

9. A polymeric composition comprising a copolymer of about 60–98.9 percent by weight acrylonitrile, about 0.1 to 5 percent by weight N-(amino-1,2,4-triazolyl) maleamic acid, and about 1 to 39.9 percent by weight vinylidene chloride.

10. A polymeric composition comprising a copolymer of about 60–98.9 percent by weight acrylonitrile, about 0.1 to 5 percent by weight N-(amino-1,2,4-triazolyl) maleamic acid, and about 1 to 39.9 percent by weight vinyl chloride.

11. A polymeric composition comprising a copolymer of about 60–98.9 percent by weight acrylonitrile, about 0.1 to 5 percent by weight N-(amino-1,2,4-triazolyl) maleamic acid, and about 1 to 39.9 percent by weight styrene.

12. A cold-drawn shaped article having molecular orientation and having dye susceptibility to acid dyes, said article comprising a copolymer of claim 7.

13. A cold-drawn fiber having molecular orientation and dye susceptibility to acid dyes, said fiber comprising a copolymer of acrylonitrile and N-(amino-1,2,4-triazolyl) maleamic acid, said copolymer having a molecular weight of at least about 10,000 and containing in the polymer molecule no more than about 15 percent by weight of said amide.

14. A cold-drawn fiber having molecular orientation and dye susceptibility to acid dyes, said fiber comprising a copolymer of about 60–98.9 percent by weight acrylonitrile, about 0.1 to 5 percent by weight N-(amino-1,2,4-triazolyl) maleamic acid, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl beta-cyano-acrylate.

15. A cold-drawn fiber having molecular orientation and dye susceptibility to acid dyes, said fiber comprising a copolymer of about 60–98.9 percent by weight acrylonitrile, about 0.1 to 5 percent by weight N-(amino-1,2,4-triazolyl) maleamic acid, and about 1 to 39.9 percent by weight vinylidene chloride.

16. A cold-drawn fiber having molecular orientation and dye susceptibility to acid dyes, said fiber comprising a copolymer of about 60–98.9 percent by weight acrylonitrile, about 0.1 to 5 percent by weight N-(amino-1,2,4-triazolyl) maleamic acid, and about 1 to 39.9 percent by weight vinyl chloride.

17. A cold-drawn fiber having molecular orientation and dye susceptibility to acid dyes, said fiber comprising a copolymer of about 60–98.9 percent by weight acrylonitrile, about 0.1 to 5 percent by weight N-(amino-1,2,4-triazolyl) maleamic acid, and about 1 to 39.9 percent by weight styrene.

18. A cold-drawn fiber having molecular orientation and dye susceptibility to acid dyes, said fiber comprising a copolymer of about 60–98.9 percent by weight acrylonitrile, about 0.1 to 5 percent by weight an amide having the following formula

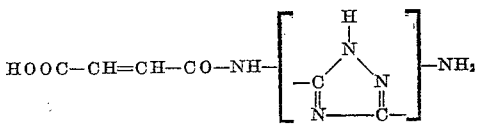

and about 1 to 39.9 percent by weight of a compound selected from the class consisting of vinyl chloride, vinylidene chloride, styrene, alpha-methylstyrene, methacrylonitrile, fumaronitrile, beta-cyano-acrylamide, and methyl beta-cyano-acrylate.

References Cited in the file of this patent

UNITED STATES PATENTS 2,643,990  Ham _____ June 30, 1953

UNITED STATES PATENT OFFICE
CERTIFICATE OF CORRECTION

Patent No. 2,825,715                                                             March 4, 1958

Gaetano F. D'Alelio

It is hereby certified that error appears in the printed specification of the above numbered patent requiring correction and that the said Letters Patent should read as corrected below.

Column 1, line 62, for "amines" read -- amides --; column 9, line 1, for "para-trifluoromethyl-tyrenes" read -- para-trifluoromethyl-styrenes --.

Signed and sealed this 26th day of August 1958.

(SEAL)

Attest:

KARL H. AXLINE                                                          ROBERT C. WATSON
Attesting Officer                                                  Commissioner of Patents